(12) United States Patent  
De Miranda et al.

(10) Patent No.: US 7,132,623 B2  
(45) Date of Patent: Nov. 7, 2006

(54) LUMINESCENCE SENSING SYSTEM FOR WELDING

(75) Inventors: Helio Cordeiro De Miranda, Fortaleza (BR); Valtair Antonio Ferraresi, Uberlandia (BR); Americo Scotti, Uberlândia (BR)

(73) Assignee: Praxair Technology, Inc., Danbury, CT (US)

( * ) Notice: Subject to any disclaimer, the term of this patent is extended or adjusted under 35 U.S.C. 154(b) by 435 days.

(21) Appl. No.: 10/401,518

(22) Filed: Mar. 27, 2003

(65) Prior Publication Data

US 2004/0034608 A1    Feb. 19, 2004

Related U.S. Application Data

(60) Provisional application No. 60/368,052, filed on Mar. 27, 2002.

(51) Int. Cl.  
*B23K 9/09* (2006.01)

(52) U.S. Cl. .............................. 219/130.51; 219/130.01

(58) Field of Classification Search ........... 219/130.51, 219/130.5, 130.01  
See application file for complete search history.

(56) References Cited

U.S. PATENT DOCUMENTS

| | | | | |
|---|---|---|---|---|
| 5,283,418 A | * | 2/1994 | Bellows et al. | 219/130.01 |
| 5,306,893 A | * | 4/1994 | Morris et al. | 219/130.01 |
| 5,327,357 A | | 7/1994 | Feinstein et al. | 364/502 |
| 5,349,156 A | * | 9/1994 | Madigan et al. | 219/130.01 |
| 5,473,139 A | | 12/1995 | Matsui | 219/130.51 |
| 5,493,688 A | | 2/1996 | Weingard | 382/157 |
| 5,510,596 A | * | 4/1996 | Xu et al. | 219/130.01 |
| 5,525,778 A | | 6/1996 | Matsui | 219/130.51 |
| 5,554,273 A | | 9/1996 | Demmin et al. | 205/785 |
| 5,571,431 A | * | 11/1996 | Lantieri et al. | 219/130.01 |
| 6,008,470 A | | 12/1999 | Zhang et al. | 219/137 PS |
| 6,442,536 B1 | | 8/2002 | Akhras et al. | 706/21 |

FOREIGN PATENT DOCUMENTS

BR    PI 0006339    11/2000

OTHER PUBLICATIONS

Demuth, et al. "Neural Network Toolbox User's Guide", Version 4, The Mathsworks, Inc.,Natick, MA, pp. 7-1-7-19(2002).  
Wang, et al. "A New Close-Loop Droplet Transfer Control System in the Pulsed GMAW", *Welding on the World*, vol. 34: 217-226 (1994).  
Wang, et al., "Arc Light Sensing of Droplet Transfer and its Analysis in Pulsed GMAW Process", *Welding Journal*, pp. 458s-469s (1997).  
Saini, et al., "An Investigation of Gas Metal Arc Welding Sound Signature for On-Line Quality Control", *Welding Journal*, pp. 172s-179s (1998).

* cited by examiner

*Primary Examiner*—Clifford C. Shaw  
(74) *Attorney, Agent, or Firm*—Gerald L. Coon

(57) ABSTRACT

A method and apparatus can adaptively control a pulsed power arc welding process. A trainable system can recognize an empirical transfer mode from a signal emitted during an arc welding pulse and determine a pulsed power parameter set to produce a modified transfer mode in a subsequent pulse, by controlling a power source using the parameter set.

22 Claims, 13 Drawing Sheets

LUMINESCENCE SENSING SYSTEM FOR WELDING

RELATED APPLICATION

This application claims the benefit of U.S. Provisional Application No. 60/368,052, filed on Mar. 27, 2002, the contents of which are incorporated herein by reference in their entirety.

BACKGROUND

Gas metal arc welding (GMAW) is commonly used to join pieces of metal in high throughput production, for example, in assembly lines employing robotic welders, such as in automotive manufacturing. An electric arc between one or more workpieces and a consumable electrode liquefies the electrode into metal droplets, which are shielded by an inert gas such as argon. These droplets form a weld by penetrating the metal of the workpieces before solidifying.

A variation called pulsed GMAW, which is controlled by pulsing the current and/or voltage of the welding power supply, is particularly preferred in high throughput production because it produces low spattering and good bead finish while generating little heat. These characteristics are essential to avoid heat distortion and residual stress on relatively thin workpieces.

A significant limitation of pulsed GMAW is the complexity of optimizing the power supply parameters in real time in response to changing materials and process variables. In an attempt to deal with this limitation, commercially available GMAW systems employ computerized parameter control in combination with recorded information about materials and ideal process conditions. However, these efforts are limited for two reasons.

Generally, such simple algorithmic control schemes involve understanding of the fundamental relationships between all process variables and the ability to measure and analyze those variables in real time. For GMAW processes, these fundamental relationships are not yet completely understood. Furthermore, were these relationships understood, it would still be expensive and complicated to measure the essential variables and calculate appropriate control actions, all in real time.

For some schemes, the level of understanding and the number of variables that are measured can be reduced by compiling databases of observed variables correlated with optimized control parameters. However, for many commercially important GMAW processes, the number of independent process variables makes this a difficult, time-consuming task. Furthermore, a specific application may introduce a process variable not contemplated during development, rendering the scheme inefficient or unusable in that application.

An attempt to solve the parameter complexity problem proposed to vary a single control variable, the pulse period, based on a single observed variable, the arc light intensity. Generally, the intensity varies with time in relation to the formation of liquid metal droplets at the arc. Because high weld quality is related directly to controlled droplet transfer, this method proposes to improve weld quality by cutting the pulse period short in response to an arc light intensity cutoff. This method, however, has not been successful because of numerous defects. First, the variation of arc light intensity does not always give a definite indication of droplet transfer. Second, many welding conditions of commercial interest do not generate sufficient variation in arc light intensity to reliably trigger a cutoff, for example, carbon steel welding shielded with argon based mixtures with less than 5% of carbon dioxide. Third, control of a GMAW process by varying each instant pulse in real time can lead to over-control of current variations, which results in control oscillation, unstable metal transfer, and poor weld quality.

SUMMARY

There is a need in the art to reduce the complexity of controlling the power parameters in a pulsed GMAW system. In particular, there is a need to create stable metal transfer in a GMAW process independent of welding materials and process conditions.

One embodiment of the invention is a method of adaptively controlling a pulsed power arc welding process. The method includes the step of sensing a signal emitted during an arc welding pulse. A trainable system is employed to recognize an empirical transfer mode from the signal and to determine a pulsed power parameter set to produce a modified transfer mode in a subsequent pulse. Another step is controlling a power source using the parameter set.

Another embodiment of the invention is a method of training a neural network for controlling a pulsed power arc welding process. Included is a step of producing training data and validation data for a plurality of pulse examples, wherein each example includes a representation of a signal emitted during at least one arc welding pulse and an empirical transfer mode for the pulse. Another step is producing a set of control flags, wherein each flag includes a classification of an empirical transfer mode relative to a target transfer mode and a control action for at least one value in a pulsed power parameter set. Yet another step is training a neural network using the training data, the validation data and the flags, whereby the network recognizes the empirical transfer mode of one or more arc welding pulses and applies the control action, thereby producing a modified transfer mode in a subsequent pulse.

Another embodiment of the invention is an apparatus for controlling a pulsed power source for arc welding, comprising a sensor and a controller. The controller further includes a signal acquisition module, whereby a signal from the sensor is acquired, and a neural network. The neural network is trained to recognize an empirical transfer mode from the signal and control a parameter set for a pulsed power source, whereby a modified transfer mode is produced in a subsequent pulse. The controller also includes a control interface to control the power source using the parameter set.

Another embodiment of the invention is a computer program product comprising a computer readable medium and instructions carried by the medium. The instruction are for causing a computer to recognize an empirical transfer mode from a signal emitted during an arc welding process, and determine a parameter set for an arc welding pulsed power source to produce a modified transfer mode.

The disclosed embodiments provide significant improvements in automated GMAW welding processes. The embodiments use a simple signal emitted by the welding process to maintain or achieve a desired single metal droplet transfer mode per welding pulse. The embodiments are compatible with signals that are noisy or give indefinite indication of droplet transfer. The embodiments are also compatible with a variety of welding conditions, including carbon steel welding shielded with argon based mixtures with less than 5% of carbon dioxide. Additionally, the embodiments lead to a stable metal transfer condition without oscillation, which gives improved weld quality and uniformity.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The disclosed embodiments are generally related to controlling an arc welding process to create a stable metal transfer condition regardless of welding materials and process conditions. Particular embodiments of the invention include a method and an apparatus for using a trainable system to control a GMAW process by recognizing a single process variable, i.e., a signal emitted by the welding process.

A pulsed GMAW process uses a power source to supply time dependent power to a workpiece, and to a consumable electrode that is brought near the area of the workpiece to be welded. An electric arc is created between the workpiece and the consumable electrode, causing metal droplets to form and transfer from the end of the consumable electrode to the workpiece.

Figure 1:
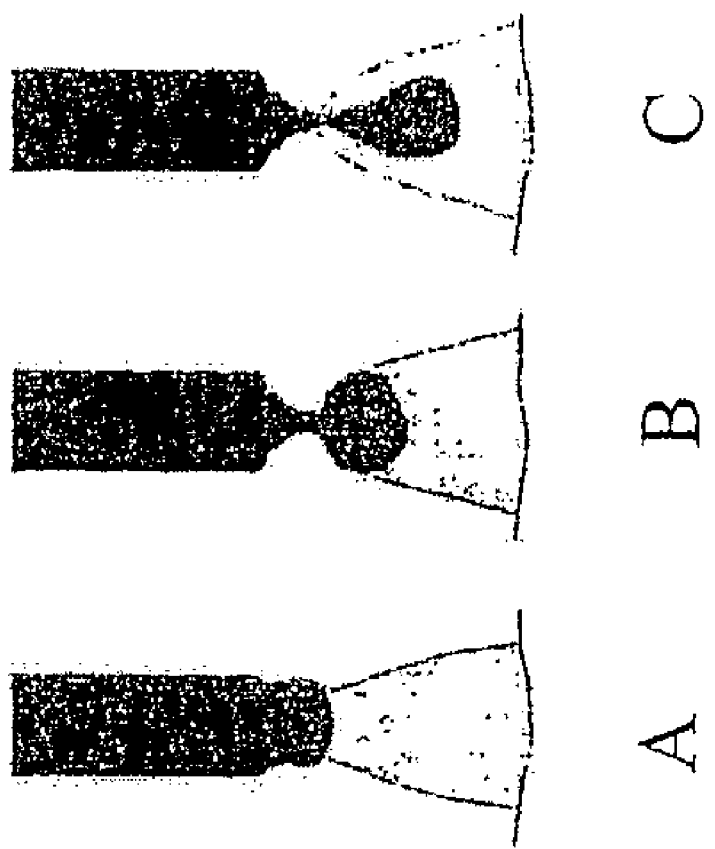
FIGS. 1A–1C are sequential schematics of metal droplet formation at a consumable electrode.

FIGS. 1A–1C are sequential schematics of metal droplet formation at the tip of a consumable electrode, showing liquefaction of the electrode tip in FIG. 1A, droplet formation in FIG. 1B, and droplet detachment in FIG. 1C.

Figure 2:
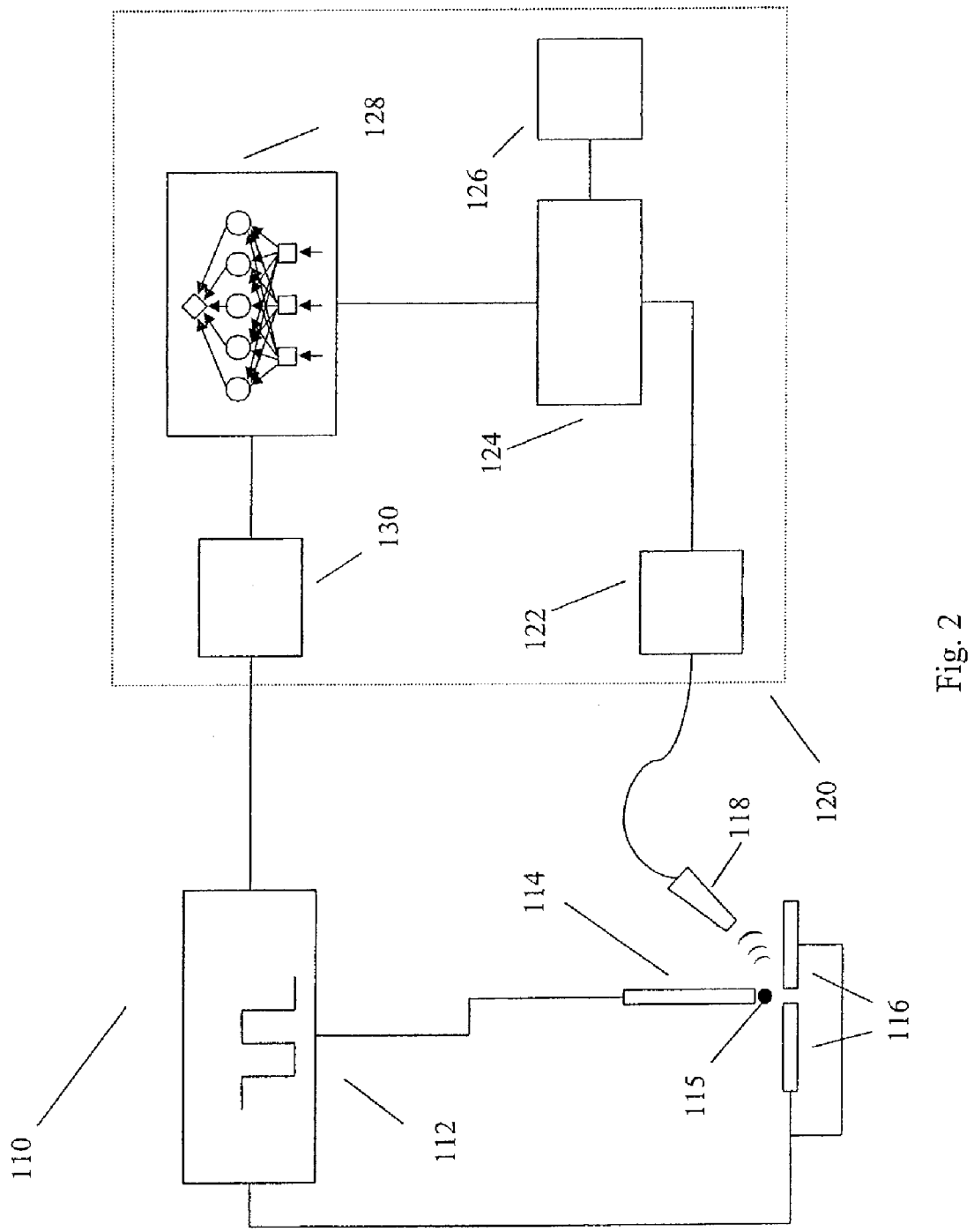
FIG. 2 is a schematic block diagram of a particular apparatus for controlling a pulsed GMAW process.

FIG. 2 is a schematic block diagram of a particular apparatus 110 for controlling a pulsed GMAW process. A welding power supply 112 is connected to a consumable metal electrode 114 and one or more workpieces 116. An electric arc is created between electrode 114 and workpieces 116, causing formation of a metal droplet 115 at the tip of electrode 114, which is transferred to the workpieces 116. A sensor 118 generates an analog electrical signal from a signal emitted by the welding process. A controller 120 includes a signal acquisition module 122, a general purpose computer 124, a display 126, a trainable system 128, and a control interface 130. The signal acquisition module 122 reads the analog signal from the sensor and optionally filters and digitizes it before sending it to computer 124. The trainable system 128 can be a standalone module or can be implemented in general purpose computer 124 as a hardware or software component. The trainable system 128 recognizes the signal and classifies the signal according to a corresponding empirical transfer mode. The trainable system 128 then outputs a control action through the control interface 130 to the power supply 112 to produce a modified transfer mode in a subsequent pulse, for example, changing the pulse period of a subsequent pulse.

In another example, the controller 120 can be configured without the trainable system 128. In this case, the computer 124 and the display 126 can be configured so that a trained operator can evaluate the signal and change the power supply parameters manually to produce a modified transfer mode.

The power supply 112 creates an electric waveform, which can be, for example, a square wave, a sine wave, a sawtooth wave, a linear combination of the preceding, and the like. Preferably, the waveform approximates a square wave.

Figure 3:
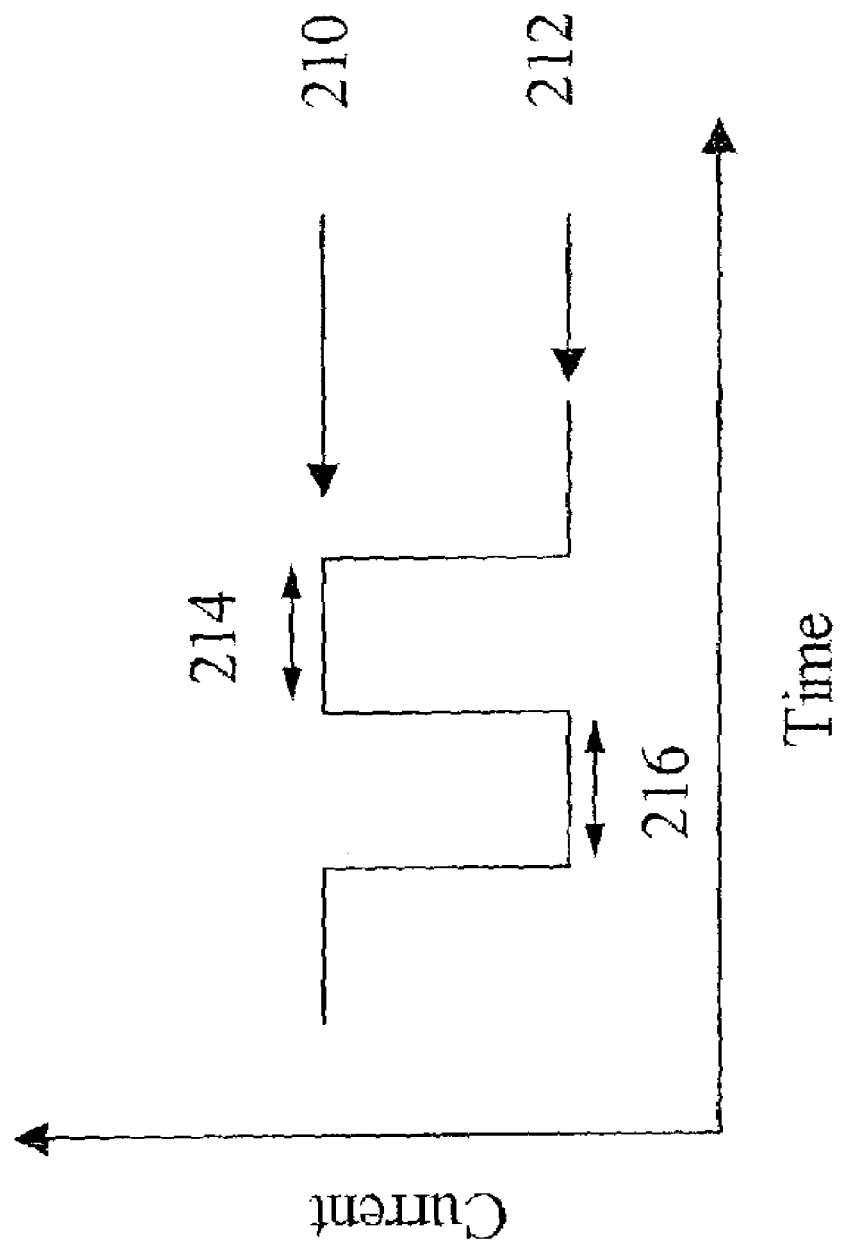
FIG. 3 is a schematic of a square wave pulse waveform created by the power supply.

For example, FIG. 3 is a schematic of a square wave pulse waveform created by the power supply 112. In FIG. 3, current is graphed as a function of time. The waveform has a frequency, a pulse current 210 (maximum current), a base current 212 (minimum current), a pulse period 214, and a base period 216. The output of the power supply 128 also has an associated pulse voltage (not shown). These parameters can be varied dependently or independently. For example, the pulse period and the base period can be varied while the frequency remains constant. The power supply can be controlled by varying one or more of these parameters, either during a pulse or for a subsequent pulse. For example, the welding process can be controlled by changing the pulse period for a future pulse.

Depending on the welding materials, the welding environment, and the power source, any number of droplets can detach during one full pulse waveform, and they can detach during any point in the waveform. Weld quality generally depends on a consistent metal transfer mode. A target transfer mode can be defined to occur when for about some percentage of pulses, one droplet is transferred per pulse during about the center of the pulse period. The percentage of pulses can be selected to be any suitable percentage, such as between about 50% and about 100%, with 90% being a particularly suitable percentage.

An empirical transfer mode is the apparent transfer mode that is indicated by the signal emitted from the arc welding process. A modified transfer mode is a transfer mode that is produced by changing one or more of the power source parameters. For example, the modified transfer mode approaches the target transfer mode, i.e., the modified transfer mode is more like the target transfer mode than the empirical mode observed prior to changing the power source parameters. More particularly, the modified transfer mode is the target transfer mode.

The droplet transfer modes can be observed by sensing a signal emitted during an arc welding pulse that is related to the droplet transfer. A signal can be, for example, radiant flux, electric potential flux, sonic emissions, mechanical vibrations, magnetic flux, and the like. A sensor is a device that senses a signal, for example, a photodiode, a charge coupled device (CCD), a galvanometer, a microphone, a piezoelectric vibration sensor, a capacitance sensor, a magnetometer, and the like. A sensor can be a passive sensor, i.e., that senses the naturally emitted signal from the welding process, or an active sensor, i.e., a sensor coupled with a device that interrogates the welding process, such as a photodiode coupled with a laser. Preferably, the signal sensed is radiant flux, i.e., luminescence naturally emitted during the arc welding pulse, and the sensor is a photodiode.

Depending on welding materials, welding environment conditions, and power source parameters, the signal that is emitted can cover a range, from clearly indicating droplet transfer to being indefinitely indicative of droplet transfer. That is, at one extreme, a signal can exhibit a distinct singular feature that is correlated with droplet transfer, and at the other extreme, a signal can represent indefinite droplet transfer behavior. "Indefinite droplet transfer" can include noisy or discontinuous signals due to noise in the process or the sensing system, and can also arise when the droplet transfer event itself is not discrete. Thus, as described below, one aspect of the invention is that the transfer mode of the signal is recognized rather than simply determined by a simple threshold or cutoff. A threshold system is not robust, i.e., it is not tolerant of indefinite behavior and cannot generally be applied to different conditions without adjustment.

Figure 4:
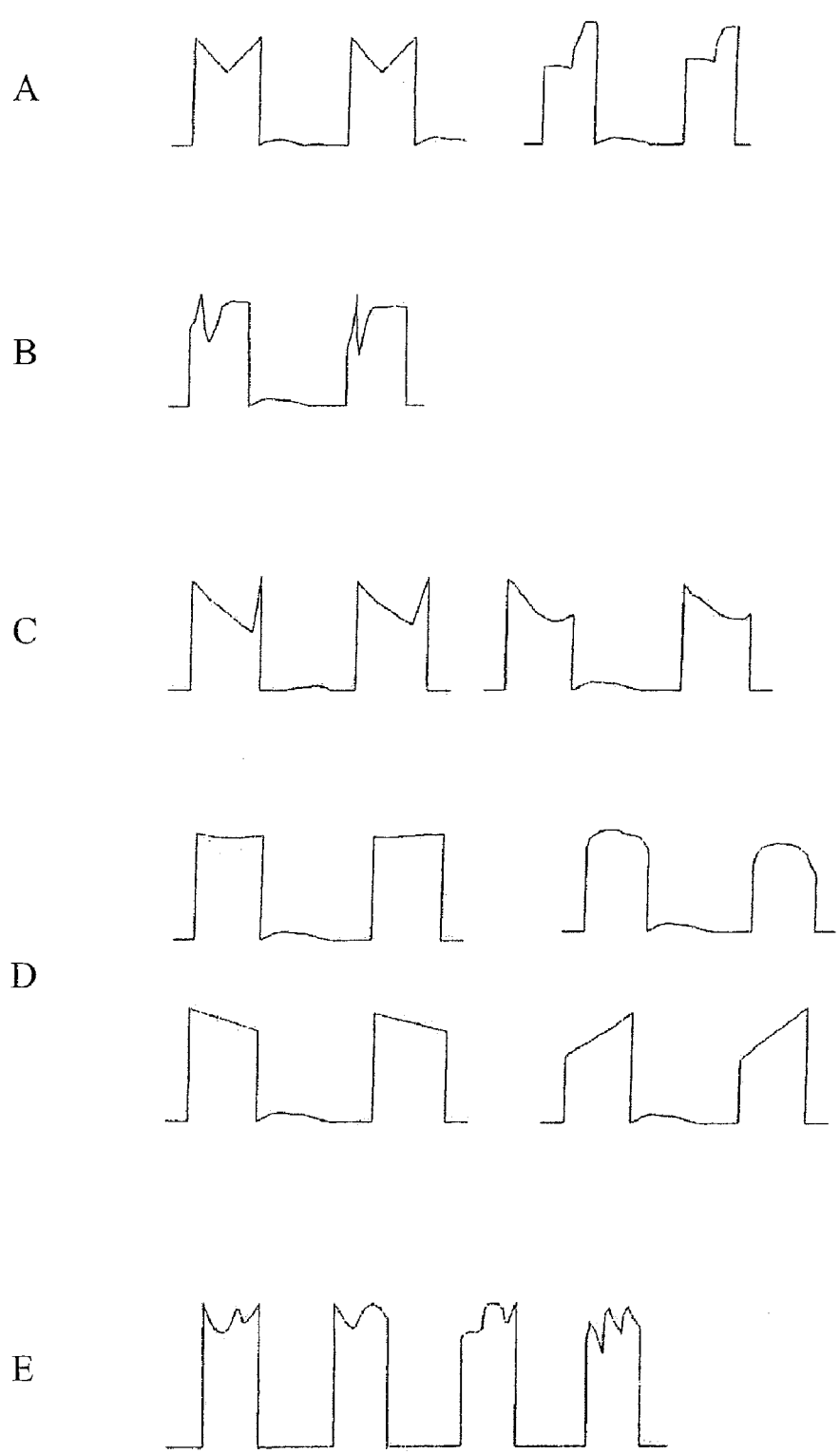
FIGS. 4A–4E show idealized schematics that represent various transfer modes.

FIGS. 4A–4E show idealized schematics that represent various transfer modes. In FIG. 4A, one droplet is transferred at about the center of the pulse; in FIG. 4B one droplet is transferred at the beginning of the pulse; in FIG. 4C one droplet per pulse is transferred at the end of the pulse; in FIG. 4D, one droplet is transferred during the base period, instead of the pulse period; and in FIG. 4E more than one droplet is transferred per pulse period.

Figure 5:
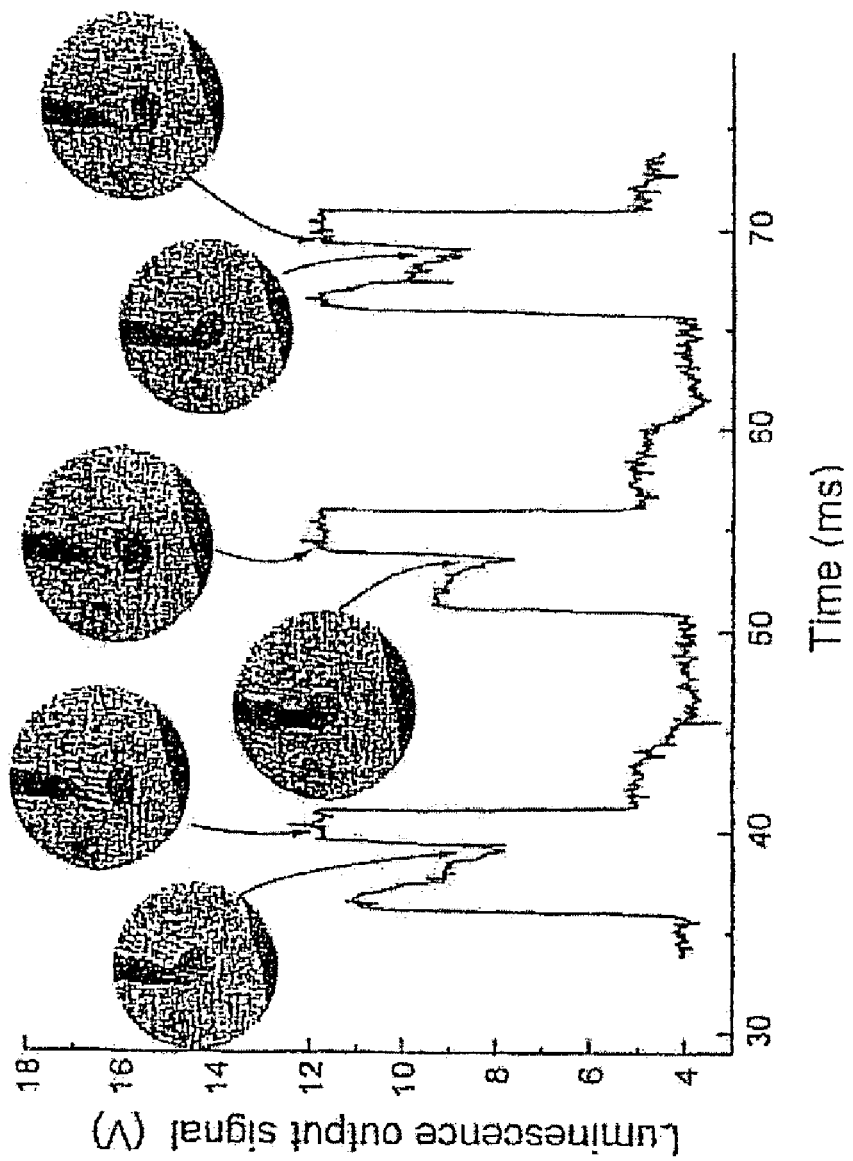
FIG. 5 is a comparison of sensor signals and videographic images that approximates one metal droplet per pulse period.
Figure 6:
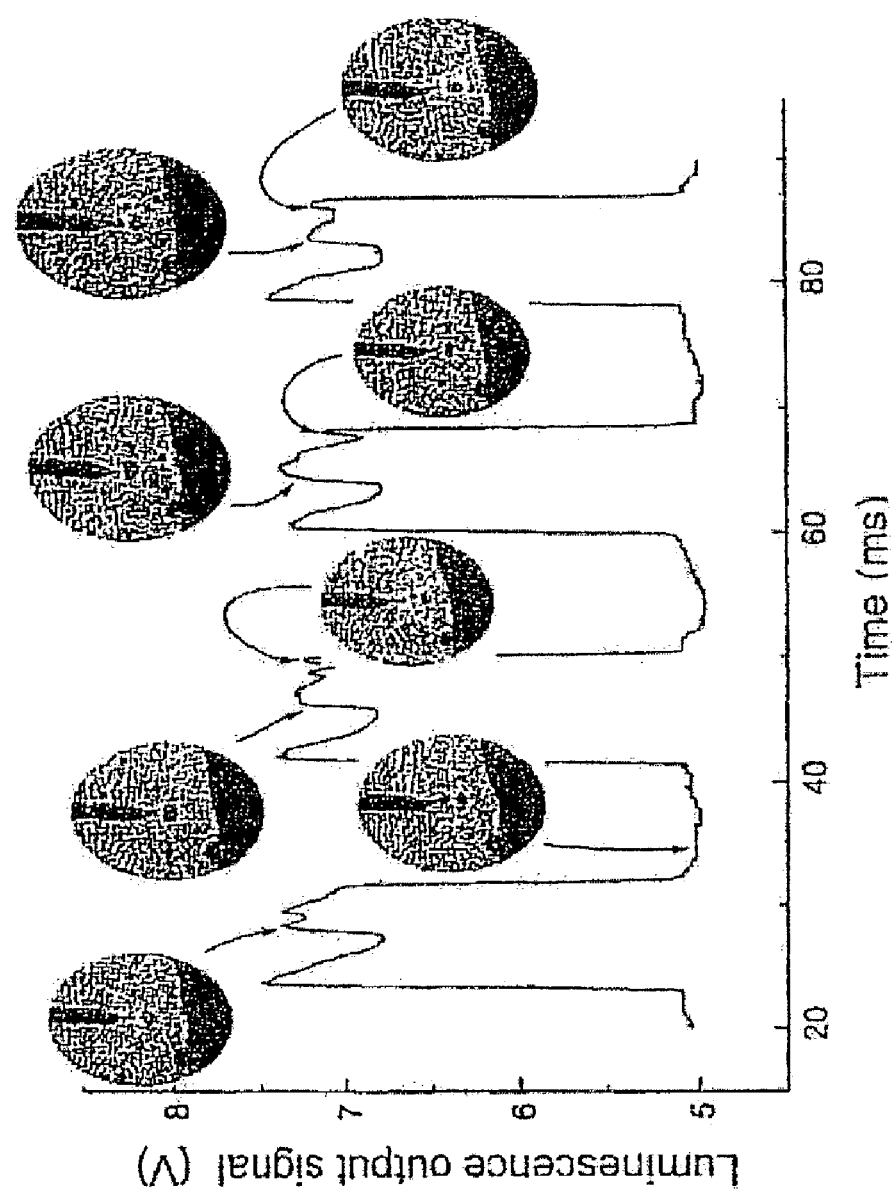
FIG. 6 is a comparison of sensor signals and videographic images that approximates more than one metal droplet per pulse period.
Figure 7:
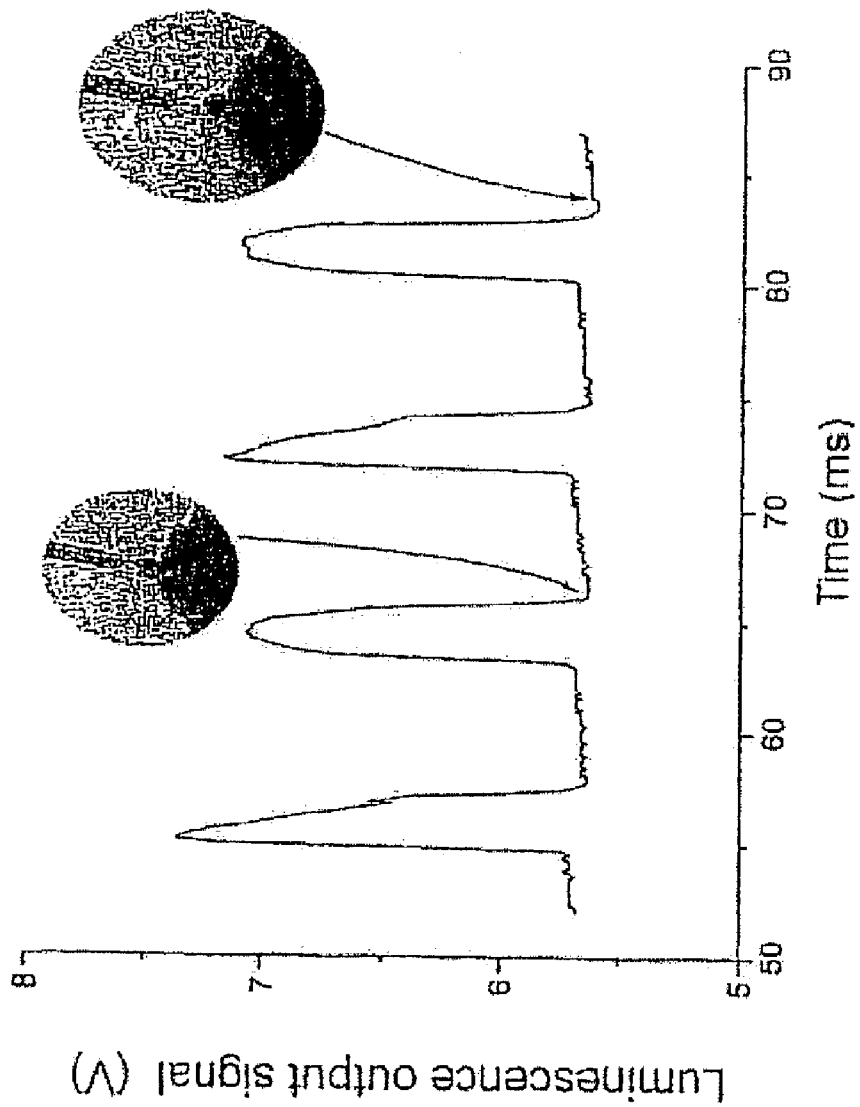
FIG. 7 is a comparison of sensor signals and videographic images that approximates less than one metal droplet per pulse period.

FIGS. 5–7 illustrate actual empirical transfer modes by comparing typical emitted luminescence signals, graphed as output in volts (V) as a function of time in milliseconds (ms); with actual high-speed video frames of the corresponding droplet transfers, where the time of each frame is indicated approximately by the arrow from each inset frame to the corresponding time point on the signal.

FIG. 5 is a comparison of sensor signals and videographic images that approximates one metal droplet per pulse period. The conditions used in FIG. 5 include a 1.2 millimeter (mm) plain carbon steel consumable electrode at a distance of about 20 mm from the workpiece; a shielding gas of about 5% $O_2$, with the balance argon; pulse current 250 A, pulse period 5 ms, base current 100 A, base period 10 ms, and wire feed speed 3.5 meters (m) per minute.

FIG. 6 is a comparison of sensor signals and videographic images that approximates more than one metal droplet per pulse period. The conditions used in FIG. 6 include a 1.2 mm stainless steel consumable electrode at a distance of about 18 mm from the workpiece; a shielding gas of about 3% $CO_2$, and 2% $N_2$, with the balance argon; pulse current 240 A, pulse period 2 ms, base current 40 A, base period 10 ms, and wire feed speed 2.1 m/min.

FIG. 7 is a comparison of sensor signals and videographic images that approximates less than one metal droplet per pulse period. The conditions used in FIG. 7 include a 1.0 mm aluminum consumable electrode at a distance of about 18 mm from the workpiece; a shielding gas of argon; pulse current 155 A, pulse period 2.5 ms, base current 20 A, base period 6 ms, and wire feed speed 4.1 m/min.

As used herein, a trainable system is a program, algorithm or other analytical method into which data are input in the form of a training set from which the system can "learn" to determine patterns and that will allow for predictions of outcomes upon analysis of unknowns similar to those in the training set. A trainable system can be a software program, an algorithm coded into hardware, such as a field programmable gate array, a hardware algorithm such as a custom microprocessor, a combination of the preceding, and the like. "Learning" and analysis of the unknown samples may be performed by any of a number of methods including the use of a support vector machine (SVM), an artificial neural network, classification and regression analysis (CART), Bayesian networks, or other algorithms, software programs or a combination thereof.

An artificial neural network is trainable system that is an interconnection of simple processing elements, units, or nodes whose functionality is loosely based on that of biological neurons. Each processing element ("neuron") transforms the summation of several weighted inputs ("synapses") into an output using non-linear transfer functions (such as sigmoid functions). As a result, neural networks are also described as parallel distributive processors.

In the invention, a number of different neural network architectures can be used, including, for example, an Adaline network, a back-propagation network, a Hopfield model, a bi-directional associative memory network, a Boltzmann machine, a counter-propagation network, a self-organizing map, an adaptive resonance theory network, a probabilistic neural network, and the like. See, for example, Masters, T. *Practical Neural Network Recipes*, New York, John Wiley, 1993, the entire teachings of which are incorporated herein by reference. More particularly, a probabilistic neural network is used. A probabilistic neural network offers several benefits, including rapid training speed, ease of training to additional examples, robustness to noisy or discontinuous data, and better performance in classifying data such as patterns. See, for example, Specht, D. F. *Neural Networks*, Vol. 3, (1990) 109–118; U.S. Pat. No. 6,442,536; U.S. Pat. No. 5,554,273; and U.S. Pat. No. 5,327,357; the entire teachings of which are incorporated herein by reference.

A probabilistic neural network is a neural network that includes two hidden layers in addition to the input and output layers, and is used to classify input data relative to training data.

Figure 8:
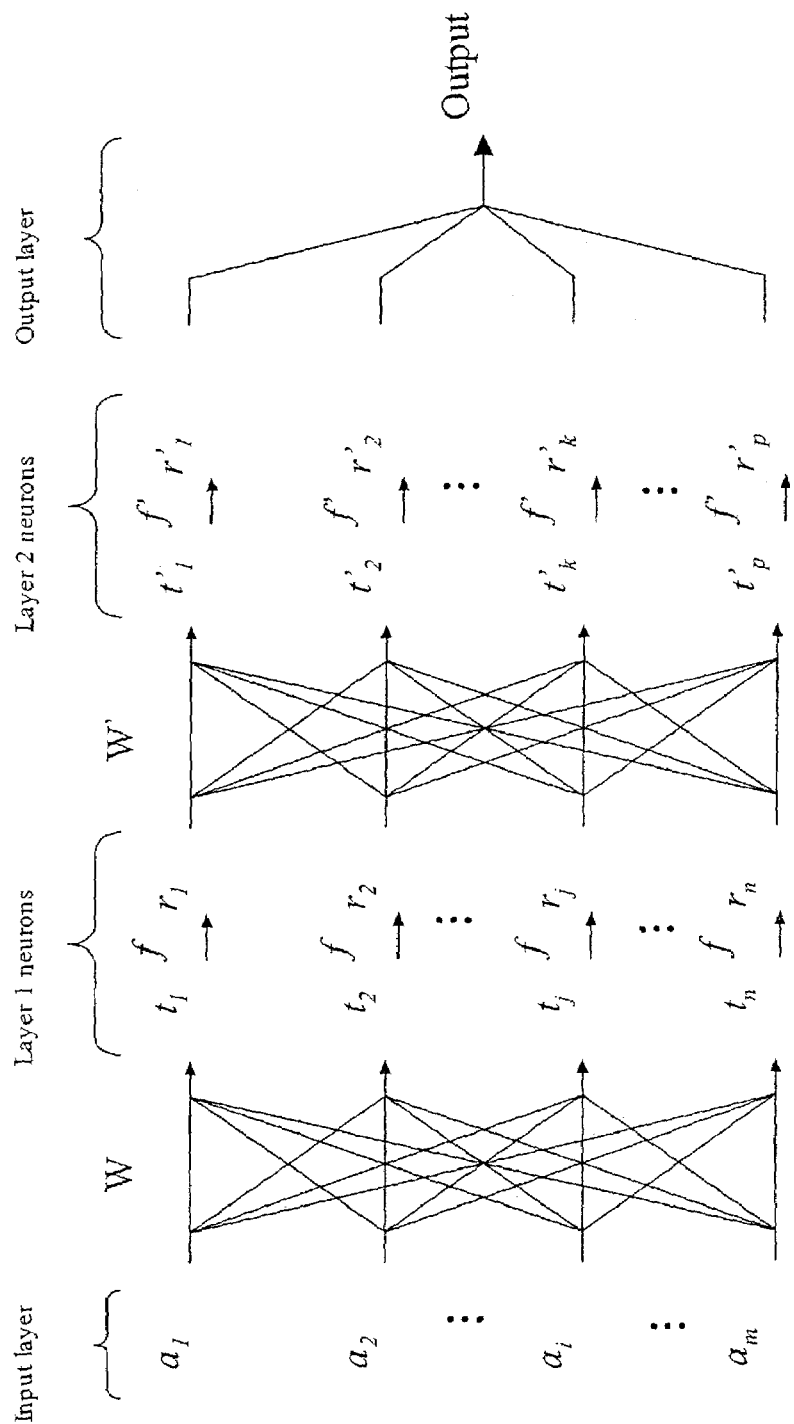
FIG. 8 shows a particular mathematical scheme of a probabilistic neural network (PNN).

For example, FIG. 8 shows a particular mathematical scheme of a probabilistic neural network. Typically, m inputs, represented as vector a (i.e., a = $\{a_1, a_2, \ldots a_i, \ldots a_m\}$), are connected to n neurons in the first hidden layer, or pattern layer, through an input weight matrix W:

$$W = \begin{matrix} w_{1,1} & w_{1,2} & \cdots & w_{1,m} \\ \cdots & & & \\ w_{j,1} & w_{j,2} & \cdots & w_{j,m} \\ \cdots & & & \\ w_{n,1} & w_{n,2} & \cdots & w_{n,m} \end{matrix}$$

The n×m weight elements of W are developed from the training data. The first layer calculates the separation between the inputs and the training data to create the net input vector t (i.e., t={$t_1$, $t_2$, ... $t_j$, ... $t_n$}) for the layer, for example:

$$t = \|Wj-a\|b = \{t_1, t_2, \ldots t_j, \ldots t_n\}$$

As shown, the calculation of each element $t_j$ can include multiplication by a bias adjustment $b_j$ (i.e., an element of bias vector b={$b_1$, $b_2$, ... $b_j$, ... $b_n$}) to adjust the sensitivity of each neuron.

Each net training input $t_j$ is then operated on by transfer function $f$, preferably a nonlinear function such as a sigmoid or a radial basis function. Most preferably, the transfer function is a radial basis function, for example:

$$r_j = f(t_j) = e^{-\left(\frac{t_j}{\sigma}\right)^2}$$

The effect of the transfer function is to calculate an output $r_j$ for each neuron representing the probability that the input data is close to the training data. The set of outputs for the first layer are thus represented by output vector r, i.e., r={$r_1$, $r_2$, ... $r_j$, ... $r_n$}. Inputs that are close to the training data will generate outputs that are close to the maximum of the transfer function; inputs that are far from the training data will generate outputs that are close to zero. An input that is close to several training inputs will have large outputs from several neurons. Parameter $\sigma$ is the spread of the basis function; a larger spread value will cause more neurons to respond to an input, and a narrower spread will cause a more specific response from fewer neurons.

The p neurons in the second, or summation layer correspond to the p classes, i.e., empirical modes, against which the input data is to be classified. The first layer is connected to the summation layer through a layer weight matrix W':

$$W' = \begin{matrix} w_{1,1} & w_{1,2} & \cdots & w_{1,n} \\ \cdots & & & \\ w_{k,1} & w_{k,2} & \cdots & w_{k,n} \\ \cdots & & & \\ w_{p,1} & w_{p,2} & \cdots & w_{p,n} \end{matrix}$$

Matrix W' is composed of n column vectors of p elements wherein each vector has a 1 for the element corresponding to one of the p classes, and zeros elsewhere. The net input vector t' to the summation layer are created by the product of matrix W' and the output r of the preceding layer:

$$t' = W'r = \{t'_1, t'_2, \ldots t'_k \ldots t'_p\}$$

Thus, the net input $t'_k$ for each second layer neuron represents the probability that the input data represents a particular class k of the p classes.

The transfer function in the second layer determines how to output this classification information. For example, the second layer transfer function is a compete function that ranks the probabilities and assigns a 1 to the highest probability value and 0 to the other values. The output then represents the class, i.e., empirical mode that the probabilistic neural network has determined for the input data. Thus, the PNN takes input data, compares it to the training data, calculates the probability that the data is in any particular class, i.e., empirical mode, and then assigns it to a class based on the probability.

Those of ordinary skill in the art should recognize that methods involved in a trainable system such as a neural network may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

One aspect regarding effective training of the network is to capture the general trends in the data without over fitting the data in order to ensure generalization of the network. To this end, the data upon which it is trained is typically divided into a training set and a validation set. The network is built by continuously adjusting weights and adding processing elements until its performance has reached a minimum criteria for the training set, and generalization is then evaluated by the performance of the network using the validation sets.

In the system, the training set includes examples of signals correlated with empirical transfer droplet transfer modes. Each example contains a representation of a signal corresponding to a pulse and an empirical transfer mode, e.g., one droplet per pulse, determined by examining a high speed videograph of that pulse. A representation of a signal can be a single pulse, a sample having a window of multiple pulses, a representative pulse from a sample of multiple pulses, a single pulse that is an average of multiple pulses, and the like. A representation of a signal is generally in discrete form. For example, a pulse can be divided into equal segments and each segment can be reduced to abstract parameters, such as an average signal parameter and a slope parameter. The validation set is of the same form as the training set, but is formed from a different experimental data collected under the same conditions.

The output of the network is a set of one or more control flags that indicate the control parameters for the power supply. For example, a system could use three flags. One flag is the default condition, i.e., the empirical transfer mode matches the target transfer mode and no change is made in the control parameters. A second flag corresponds to an empirical mode that does not match the target mode, for example, less than one droplet per pulse when the target mode is one droplet per pulse. In this example, a control action is an incremental increase in the pulse period. A third flag corresponds to more than one droplet per pulse and has the control action of an incremental decrease in the pulse period. Additional flags can be used to provide smaller increments for the control outputs, or to provide separate control outputs for different parameters.

A particular embodiment of present invention is illustrated by the following example, which is not intended to be limiting in any way.

Figure 9:
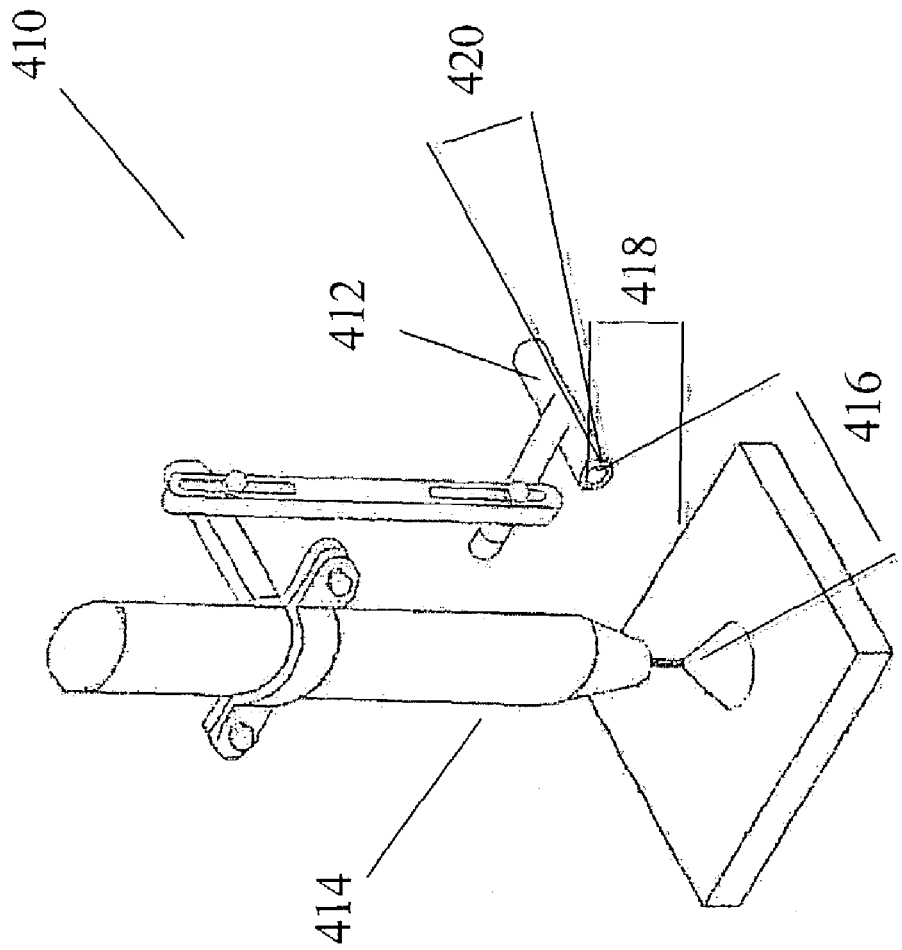
FIG. 9 is an illustration of a particular welding apparatus with the sensor.

FIG. 9 is an illustration of a particular welding apparatus 410 with the sensor. A sensor housing 412 is mounted in relation to a welding gun 414. The housing is mounted on or near the welding gun, as shown. Suitable mounting hardware is provided for positioning adjustments, such as the sensor-arc axis distance 416, the sensor-metal base height 418 and the working angle 420. The position of the housing is adjusted in a practice run to ensure that the sensor is getting sufficient signal.

Figure 10:
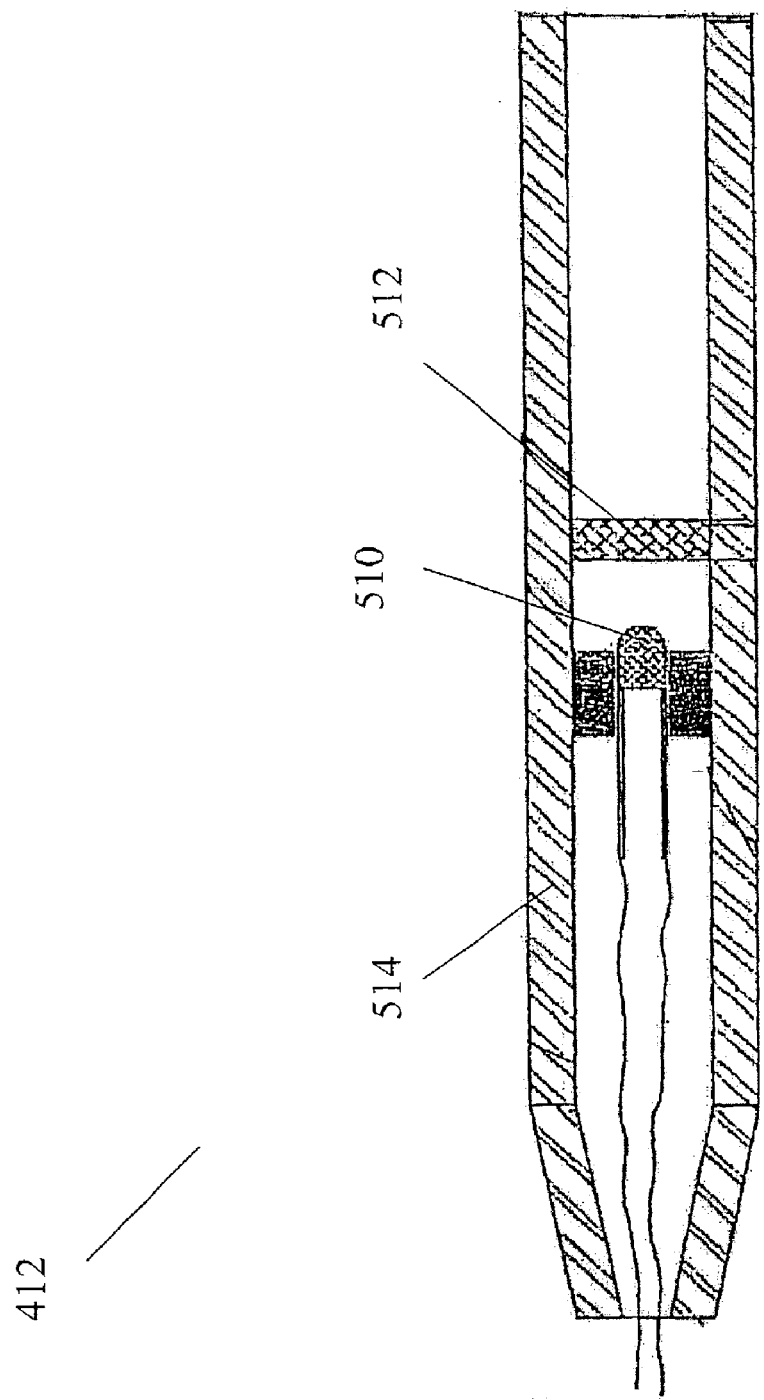
FIG. 10 is an illustration of a cross section of a particular sensor housing.

FIG. 10 is an illustration of a cross section of the particular sensor housing 412. A sensor diode 510 is mounted in an alumina housing 512. A neutral density filter 514 (shade number 10), such as that used in welding goggles, is attached in front of the sensor. This filter protects the sensor from excess light and heat, and excludes metal spattered by the welding process from the sensor cavity.

The photodiode sensor used to measure luminescence emitted by the welding process was chosen so that it operates in a linear region of its response curve, i.e.; so that its maximum gain overlaps with the signal emitted by the welding process in question. In this example, the sensor is a TIL78, a high-speed silicon PIN photodiode with the following technical specifications: peak wavelength=890 nm; light current (max)=28.5 μA; dark current (max)=60 nA; rise/fall time=5 ns; power dissipation=100 mW; acceptance angle=120°; capacitance (VR=20V)=4 pF; and operating temp.=−40° C. a +100° C.

The current from the sensor can be amplified and digitized by a signal interface, which can be any of a number of acquisition systems known to one skilled in the art, such as a custom signal interface, a software package, a software configurable analog/digital data acquisition card for a PC, and the like. For example, commercially available solutions that can be used include software packages, e.g., MATLAB® 6.5 with Neural Network Toolbox 4.0.2 (The MathWorks, Inc. Natick, Mass.), or a combined hardware/software system, e.g., a NI PCI-6071E analog/digital data acquisition card combined with LabVIEW software (both from National Instruments Corporation, Austin Tex.).

Figure 11:
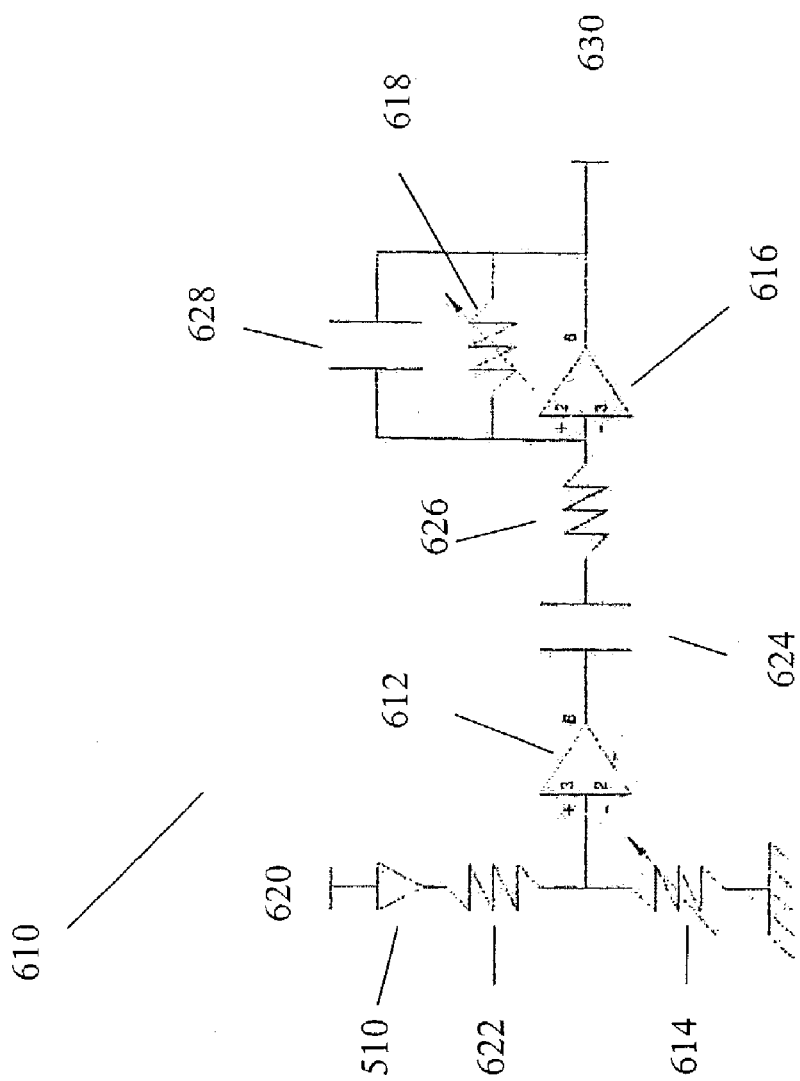
FIG. 11 is an electrical schematic of a portion of a particular signal acquisition module.

FIG. 11 is an electrical schematic of a portion of a particular signal acquisition module. In this circuit 610, the current signal from the photodiode sensor 510 is amplified and converted to a voltage signal by an op amp 612 such as a INA114. The gain of this op amp can be adjusted by a variable resistor 614, to avoid saturating the output signal. In this example, an appropriate output level for the op amp 612 output signal is about 10% (around 1 V) of the amplifier voltage supply (10–12 V).

A second op amp 616, in this case an LM741, trims the gain. Again, a variable resistor 618 adjusts the gain between the input voltage signal and the output voltage signal. Through routine experimentation, the two variable resistors can be adjusted so that the extremes of the photodiode signal, corresponding to base current and pulse current, are within the linear range of each op amp. The circuit is additionally provided with a 5 to 9 V power supply 620, a 984 ohm fixed resistor 622, a 63 V, 47 microfarad capacitor 624, a fixed 559 ohm resistor 626, a 63 V, 47 microfarad capacitor 628, and signal output at 630.

Figure 12:
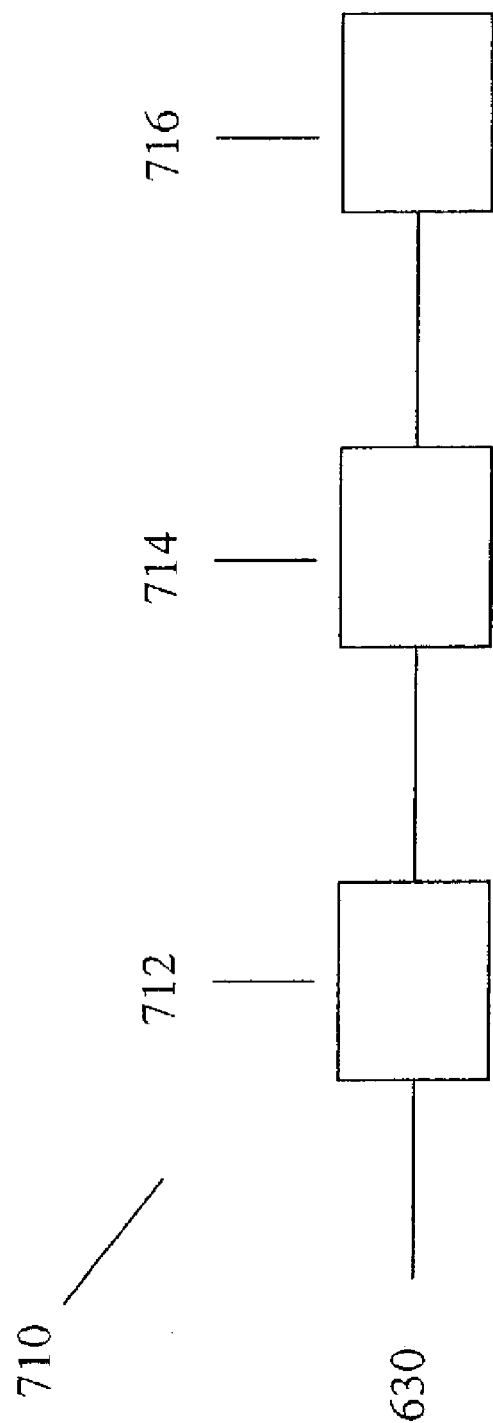
FIG. 12 is a block diagram of the analog to digital processing circuitry of the particular signal acquisition module.

FIG. 12 is a block diagram of the analog to digital processing circuitry of a particular signal acquisition module. In acquisition module 710, output 630, amplified to fit the range capability of A/D converter 714 (±10 volts), is conditioned by a low-pass filter 712 (cut-off of 2 kHz). This prevents aliasing caused by input signal frequencies higher than the acquisition capability. In this example, A/D converter 714 is an ADS7806, a 12 bit A/D converter. For this example, 12-bit resolution is sufficient to collect the relevant information, but higher sampling rates can be used. The digital output signal can be directed either to a PC parallel port 716 for display or to the neural network.

If the data is sent to a PC, any of a number of data display programs known to the art can be used to graph and analyze the data, for example the MATLAB® software above. Alternatively, a dedicated program can be written to visualize the data. In these cases, the recognition of the empirical transfer mode relative to a target transfer mode can be performed by a trained user. The user can modify the parameters of the pulsed power supply until the empirical transfer mode signal appears to match the target transfer mode signal.

In this example, however, automatic control of the pulse power parameters was provided by a two-layer probabilistic artificial neural network created using the MATLAB® software above.

During development of the neural network, two data sets were created, a training data set and a validation data set. Each set contained information for seven hundred pulses. The raw signal data is acquired using several batches of experiments, using one or more of the parameters as follows: gas type (pure Ar, Ar+2% $O_2$, Ar+4% $CO_2$, Ar+8% $CO_2$, Ar+5% $O_2$, Ar+3% CO2+2% N2), consumable electrode composition (plain carbon steel, stainless steel and aluminum) and consumable electrode size (diameters of 1.0 and 1.2 mm), welding position (flat and overhead) and joint configuration (bead-on-plate and grooved). The power supply parameters are set so that the pulse period can be varied through a range of transfer modes around the target transfer mode of one droplet per pulse, from less than one droplet per pulse to more than one droplet per pulse.

The experimental conditions vary among experiments within each data set and the sensor signals are conditioned by the neural network according to parametric values, which will lead to the identification of different patterns, as follows: Each period was partitioned into five equal segments. Two values were calculated for each segment; pulse current dispersion D, which is the ratio of the mean current of a partition to the maximum current of the period; and slope, or the rate of change of signal versus time. The raw sensor signal data is prepared before inclusion in each data set. To avoid problems with transient signals and noise, sensor signal data is acquired in sample windows, in this example in windows containing 10 pulses. Each pulse period within a window is treated separately, i.e., the data is separated into discrete pulse periods. In this example, Thus, each pulse period generated 5×2=10 values that together constitute a pattern. The patterns for the 10 periods within each sample window were ranked, and the most common pattern was selected as representative of the entire sample window.

Actual droplet detachment behavior was recorded by high speed videography. The videography was performed by a dedicated computer controlled system that automatically correlated the images with the sensor data. The system includes a Ne—He laser to illuminate the welding zone and the resultant images are captured by a 2000 frame-per-second video camera. Details of this videographic system are described in Bálsamo, PSS; Vilarinho, LO; Vilela, M; Scotti, A. *International Journal of Joining Materials*, Vol. 12, (2000) pp. 1–12, the entire teachings of which are incorporated herein by reference.

A series of control flags are determined for the network. In this example, empirical droplet transfer modes are classified into seven control flags centered on the target transfer mode. The target mode is one droplet per pulse, transferred at about the center of the pulse period. In terms of controlling the pulse period for a subsequent pulse, the flags indicate to the system what changes, if any, should be made. Flags 1–3 indicate that the pulse period should be longer, while flags 5–7 indicate that the pulse period should be shorter. Flag 4 is the default condition, i.e., the empirical mode matches the target mode. Using these flags and the high-speed video images above, the droplet transfer mode of each pulse the empirical transfer mode of each pulse in the training and validation data sets is classified.

TABLE 1

Flags used to classify droplet transfer modes

Flag 1  less than one droplet per pulse, pulse period much shorter than ideal (the droplet detaches during the next base period or even after additional pulses) Control action: add 3 ms to next pulse period;

Flag 2  less than one droplet per pulse, pulse period shorter than ideal, yet close to the condition for one drop per pulse (the droplet usually detaches during the next base period, yet sometimes happens every other pulse) Control action: add 2 ms to next pulse period;

Flag 3  one droplet per pulse, with slightly less than ideal pulse period, i.e. (the droplet detaches at the very end of the pulse, and it is the most desirable condition) Control action: add 1 ms to next pulse period;

Flag 4  one droplet per pulse, with ideal pulse period (the droplet detaches at the center of the pulse, and it is a desirable condition);

Flag 5  one drop per pulse, with slightly more than ideal pulse period (the droplet detaches at the beginning of the pulse) Control action: subtract 1 ms to next pulse period;

Flag 6  more than one drop per pulse, pulse period longer than ideal, yet close to the condition for one drop per pulse (one droplet usually detaches during the pulse and another one during the base period, yet sometimes two droplets detach during the pulse period) Control action: subtract 2 ms to next pulse period; and Flag 7  more than one droplet per pulse, pulse period much longer than ideal (the droplet usually detaches twice or more during the pulse period and after the pulse) Control action: subtract 3 ms to next pulse period.

Two data sets, the training set and the validation set, are created from the characterized raw data and the assigned control flags. Table 2 shows the structure of the sets used for this example. Each record contains the representative pulse pattern selected from the 10-pulse sample window described above, i.e., the dispersion (D) and slope values (S) calculated from the data for each segment. Thus, each record in the set contains ten characterization numbers plus the assigned control flag. Enough data is collected to provide a substantial number of pulse records for each data set, in this example, 700 pulse records per set. While conditions vary among experiments within each data set, the range of conditions between data sets is identical.

TABLE 2

Example of Data Set Structure

| Record # | 1 | 2 | 3 | ... | ... | 700 |
|---|---|---|---|---|---|---|
| Seg. #1 | $D_{1,1}$ | $D_{1,2}$ | $D_{1,3}$ | ... | ... | $D_{1,700}$ |
|  | $S_{1,1}$ | $S_{1,2}$ | $S_{1,3}$ | ... | ... | $S_{1,700}$ |
| Seg. #2 | $D_{2,1}$ | $D2,2$ | $D_{2,3}$ | ... | ... | $D_{2,700}$ |
|  | $S_{2,1}$ | $S_{2,2}$ | $S_{2,3}$ | ... | ... | $S_{2,700}$ |
| Seg. #3 | $D_{3,1}$ | $D3,2$ | $D3,3$ | ... | ... | $D_{3,700}$ |
|  | $S_{3,1}$ | $S_{3,2}$ | $S_{3,3}$ | ... | ... | $S_{3,700}$ |
| Seg. #4 | $D_{4,1}$ | $D_{4,2}$ | $D_{4,3}$ | ... | ... | $D_{4,700}$ |
|  | $S_{4,1}$ | $S_{4,2}$ | $S_{4,3}$ | ... | ... | $S_{4,700}$ |
| Seg. #5 | $D_{5,1}$ | $D5,2$ | $D5,3$ | ... | ... | $D_{5,700}$ |
|  | $S_{5,1}$ | $S_{5,2}$ | $S_{5,3}$ | ... | ... | $S_{5,700}$ |
| Control Flag | 1 | 5 | 3 | ... | ... | 4 |

Figure 13:
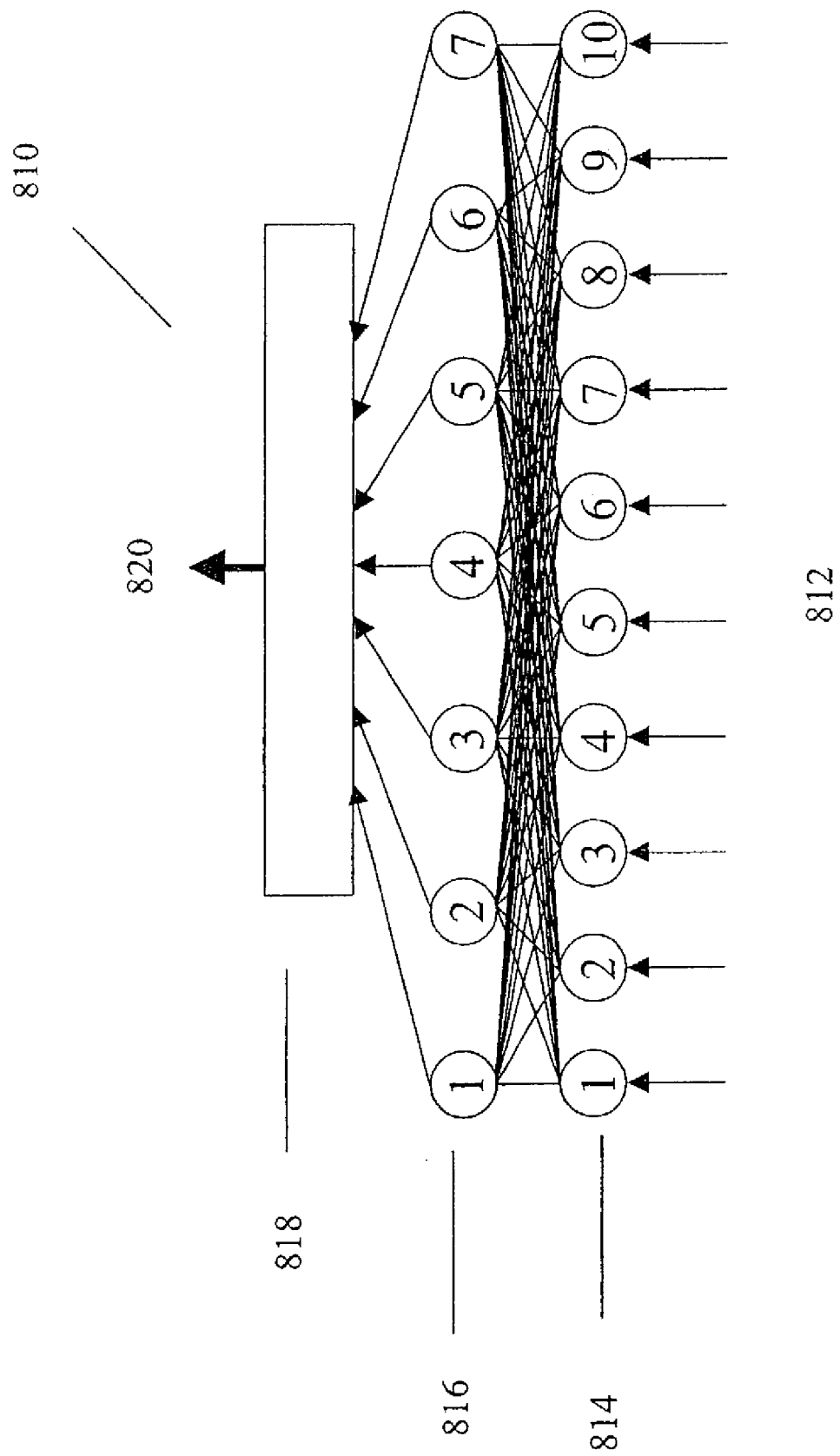
FIG. 13 is schematic of the topology of a particular PNN.

FIG. 13 is schematic of the topology of the particular PNN used in this example. In PNN 810, the input layer 812, sends the set of m=10 inputs, corresponding to the ten data points, i.e., the five D and five S values, to a pattern layer 814 containing n=10 neurons. Pattern layer 816 is connected to the p=7 neurons of summation layer 816, corresponding to the 7 empirical modes which described the data. Output layer 818 collects the classifications from the summation transfer function and sends the control flag corresponding to the classified empirical mode to the output 820.

The PNN is trained using the training data set. Subsequently, the validation data set is used to assure that the trained network could recognize new signals with acceptable accuracy, without being over-trained. In the validation phase for this example, the level of matching between the predicted flag by the neural network and the actually flag assigned in the validation data is greater than 90%, often greater than 98%.

The trained system is then used to operate the welding power supply in a live test. The system readily varies the pulse period parameter to change the empirical transfer mode to a modified mode, eventually maintaining the target transfer mode of one droplet per pulse. The performance is verified by comparing the sensor signal over time with high-speed videography of the welding process, where the change in the transfer mode from any empirical mode to the target transfer mode is readily seen.

The experiment can be varied by sending the signal directly to a display, instead of or in addition to the neural network, where a trained operator can compare the signal with the signal schematics shown in FIGS. 4A–E. The operator varies the pulse period of the power supply to change the empirical (displayed) transfer mode to a modified mode, eventually matching the target transfer mode of one droplet per pulse. Again, the performance is easily verified by comparing the sensor signal over time with high-speed videography of the welding process.

In a variation, only three flags are used, i.e., an increment action, a decrement action, and no action, for example, flags 3, 4, and 5 as described above. A larger number of flags gives finer control, but is less robust, i.e., is harder to generalize to new systems.

In another variation, only two flags are used, i.e., no action, or an adjustment that can be either an increment or decrement action. For example, if the empirical transfer mode is the target mode, no action is taken. If the empirical mode is not the target mode, the system "guesses" a direction for the adjustments, either increasing or decreasing. If the target mode is not reached within a timeout period, the adjustment proceeds in the opposite direction.

In another variation, the size of the sample window is varied, choosing from 1 to 40 pulses per window. It is found that lower numbers of pulses lead to less robust control, i.e., the system is more susceptible to transients and noise, while with larger numbers of pulses, the system is more robust but the control action is slower. If the number becomes significantly larger than 40, control instability results.

Another variation is to change the interface gain by manually adjusting the resistors R1 and R2. Alternatively, an automatic gain circuit can be combined with a second light sensor to adjust the resistors automatically based on the overall light emitted by the arc.

Yet another alternative is to have a more generic system. Instead of having the neural network trained for a few select conditions (for a given electrode size, material, and gas composition) at a time, it can be trained for a wide range of contemplated conditions at the same time. This typically involves more experiments, larger training and validation sets, and longer training times, but can result in a trained system that is capable of controlling the welding process under a much wider range of conditions.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A method of adaptively controlling a pulsed power arc welding process, comprising:
   sensing a signal emitted during an arc welding pulse;
   employing a trainable system to:
      recognize an empirical transfer mode from the signal;
      determine a pulsed power parameter set to produce a modified transfer mode in a subsequent pulse; and
   controlling a power source using the parameter set.

2. The method of claim 1, wherein the signal is a radiant flux signal.

3. The method of claim 2, whereby only a single metal droplet is transferred during each pulse for about 90% of the pulses.

4. The method of claim 3, wherein the parameter set comprises at least one value selected from the group consisting of pulse current, pulse voltage, base current, pulse period, frequency, and base period.

5. The method of claim 4, wherein the modified transfer mode is produced by controlling the pulse period.

6. The method of claim 5, wherein the empirical transfer mode comprises indefinite droplet transfer behavior.

7. The method of claim 5, wherein the trainable system is an artificial neural network.

8. A method of controlling a pulsed power arc-welding process, comprising:
   sensing a radiant flux signal emitted during an arc welding pulse;
   employing a neural network to:
      recognize an empirical transfer mode from the signal;
      determine a pulse period increment to produce a modified transfer mode in a subsequent pulse; and
   controlling a power source using pulse period increment, whereby only a single metal droplet is transferred during each pulse for at least about 90% of the pulses.

9. A method of training a neural network for controlling a pulsed power arc welding process, comprising:
   producing training data and validation data for a plurality of pulse examples, wherein each example includes:
      a representation of a signal emitted during at least one arc welding pulse;
      an empirical transfer mode for the pulse;
   producing a set of control flags, wherein each flag includes:
      a classification of an empirical transfer mode relative to a target transfer mode;
      a control action for at least one value in a pulsed power parameter set; and
   training a neural network using the training data, the validation data and the flags, whereby the network:
      recognizes the empirical transfer mode 01 one or more arc welding pulses; and
      applies the control action, thereby producing a modified transfer mode in a subsequent pulse.

10. The method of claim 9, wherein the signal is a radiant flux signal.

11. The method of claim 10, wherein the target transfer mode consists essentially of a single metal droplet transferred during each pulse for about 90% of the pulses.

12. The method of claim 11, wherein the parameter set comprises a value selected from the group consisting of pulse current, pulse voltage, base current, pulse period, frequency, and base period.

13. The method of claim 12, wherein the neural network produces the modified transfer mode by controlling the pulse period.

14. The method of claim 13, wherein the empirical transfer mode comprises indefinite droplet transfer behavior.

15. An apparatus for controlling a pulsed power source for arc welding, comprising:
   a sensor;
   a controller, comprising:
      a signal acquisition module, whereby a signal from the sensor is acquired;
      a trainable system, wherein the system is trained to:
         recognize an empirical transfer mode from the signal;
         control a parameter set for a pulsed power source, whereby a modified transfer mode is produced in a subsequent pulse; and
      a control interface to control the power source using the parameter set.

16. The apparatus of claim 15, wherein the sensor comprises a photodiode.

17. The apparatus of claim 16, wherein the trainable system is a neural network.

18. The apparatus of claim 17, wherein the signal acquisition module comprises an amplifier and an analog to digital converter.

19. The apparatus of claim 18, wherein the parameter set comprises a value selected from the group consisting of pulse current, pulse voltage, base current, pulse period, frequency, and base period.

20. An apparatus for controlling a pulsed power source for arc welding, comprising a neural network trained to:
   recognize an empirical transfer mode from a signal emitted during an arc welding process; and
   determine a parameter set for an arc welding pulsed power source to produce a modified transfer mode.

21. A system for adaptively controlling a pulsed power arc welding process, comprising:
   means to sense a signal emitted during an arc welding pulse;
   a trainable system comprising:
      means to recognize an empirical transfer mode from the signal;
      means to determine a pulsed power parameter set to produce a modified transfer mode in a subsequent pulse; and
   means to control a power source using the parameter set.

22. A system to control a pulsed power arc-welding process, comprising
   means to sense a radiant flux signal emitted during an arc welding pulse;
   a neural network comprising:
      means to recognize an empirical transfer mode from the signal;
      means to determine a pulsed power parameter set to produce a modified transfer mode in a subsequent pulse; and
   means to control a power source using pulse period increment, whereby only a single metal droplet is transferred during each pulse for at least about 90% of the pulses.

* * * * *